Sept. 18, 1951  H. S. ALEXANDER  2,568,577
READING PACER APPARATUS
Filed Jan. 23, 1951  3 Sheets-Sheet 1
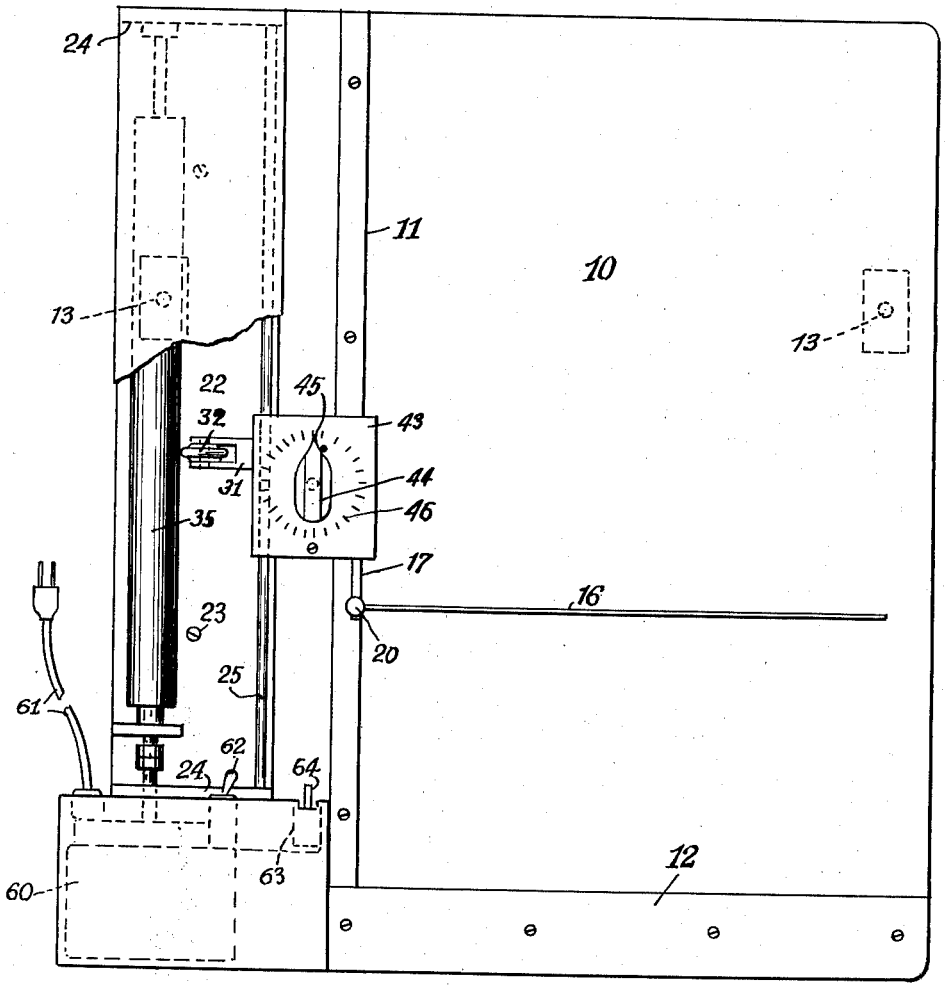
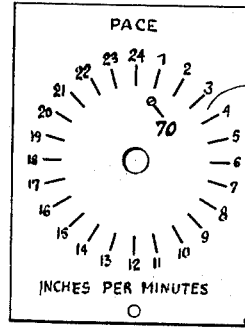
Henry S. Alexander
INVENTOR.
BY
Ivan E. G. Konigsberg
Atty.

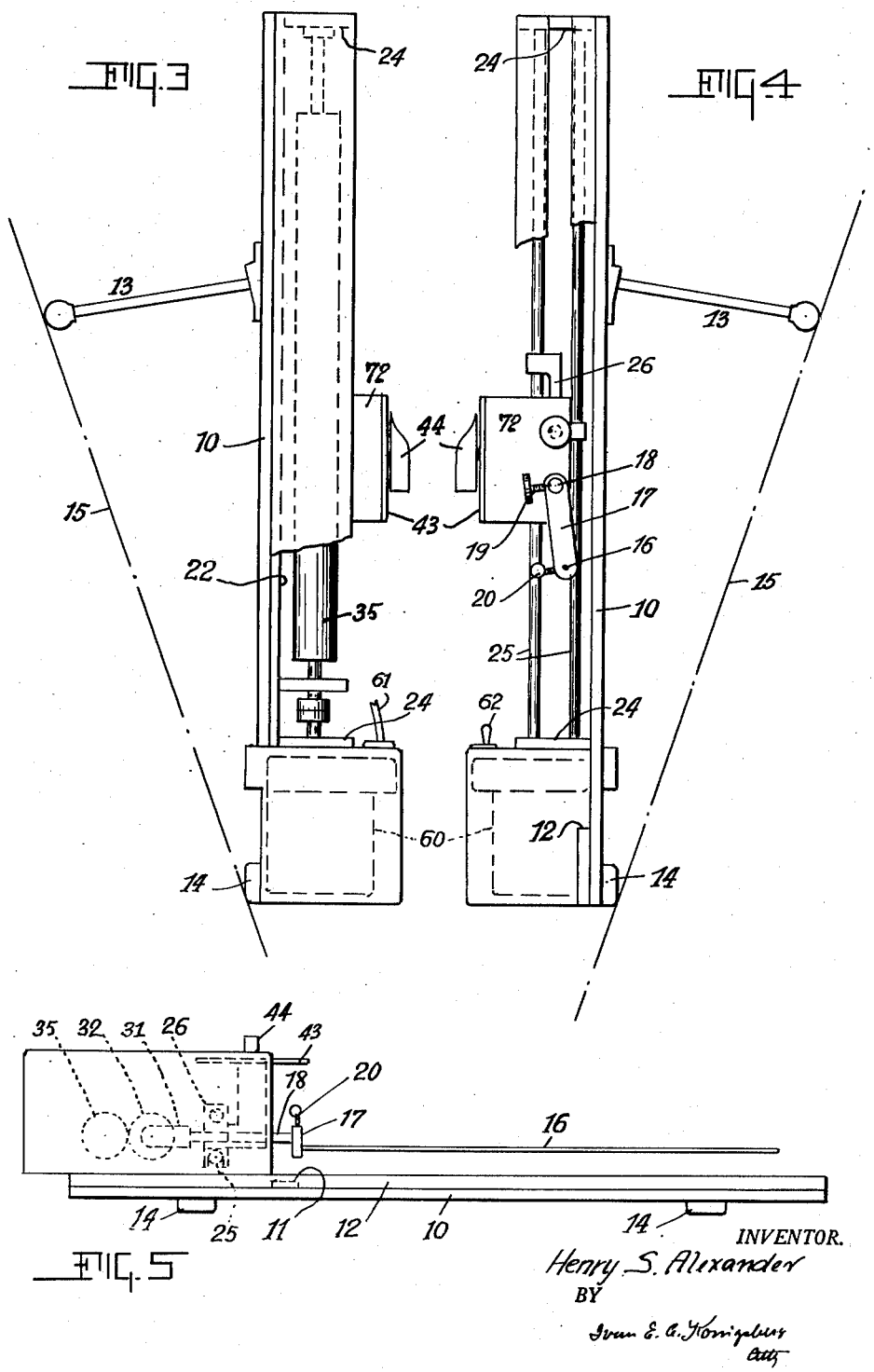

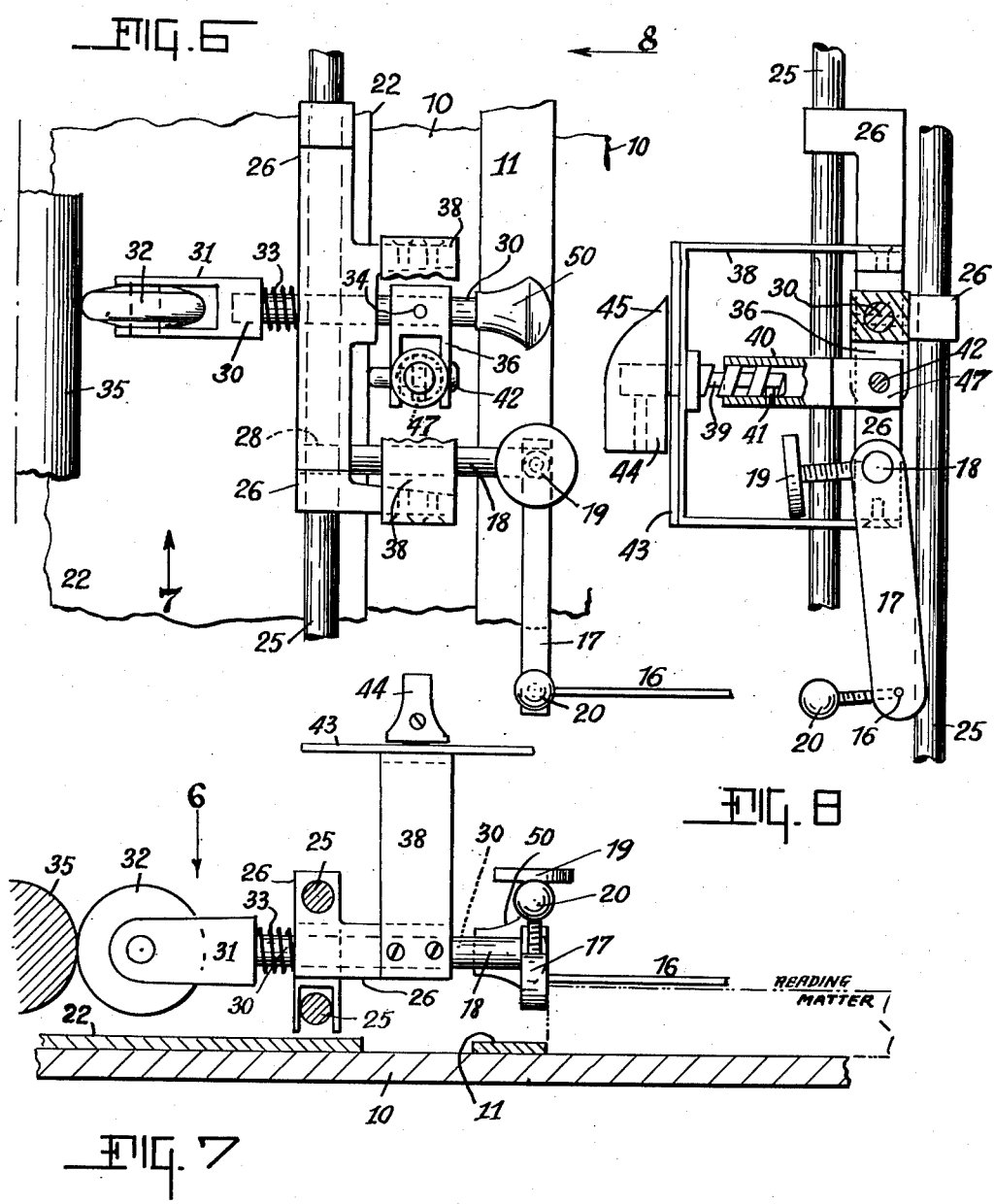

Patented Sept. 18, 1951

2,568,577

UNITED STATES PATENT OFFICE 2,568,577

READING PACER APPARATUS

Henry S. Alexander, Meadville, Pa., assignor to Keystone View Company, Meadville, Pa., a corporation of Pennsylvania Application January 23, 1951, Serial No. 207,334

6 Claims. (Cl. 35—35)

This invention relates to improvements in reading pacer apparatus of the type in which a line pace indicator is operated to move from top to bottom of a page of reading matter at a selected speed whereby to train the user in the ability to read at a speed which has been found to be the correct speed for a person of a certain age or degree of intelligence.

One of the objects of the invention is to provide an apparatus in which the reading matter is exposed to view instead of being partly hidden as in some prior devices. A thin straight pacer bar is caused to move from line to line and functions merely as a pace indicator, the movements of which becomes interesting and exciting and inspires the user to achieve the desired speed of reading.

Another object is to provide an apparatus which is adapted for use with books or magazines without requiring single leaves to be torn out. Still another object is to provide an operating mechanism for the pacer bar so that the latter may be moved at any desirable pacing speed without perceptible interruption or stepwise operation. Other objects of the invention are to provide an apparatus of simple, efficient construction, size and design so as to be safely operated.

The invention is embodied in a reading pacer apparatus which includes a table for the support of the reading matter. A thin pacer bar extends across the table parallel to the lines of the reading matter. The bar may be adjusted in accordance with the thickness of the sheet, book or magazine used. The pacer bar is carried by a bracket which supports a friction wheel. The latter engages a friction roller which is driven by an electric motor. The friction wheel may be set at any operating angle with respect to the driven roller. By inclining the wheel with respect to the roller, the wheel will follow a track which would mark a spiral around the roller, i. e. the wheel will follow the course of a screw thread. The greater the angle of inclination of the wheel, the coarser the thread and the faster the travel of the wheel along the roller. Thus a thread of infinitely variable pitch has been provided within the limits of practical construction.

As the roller is rotated, the wheel and the pacer bar move from top to bottom of the page. When the bar reaches the bottom or any other desired lower position, the wheel may be manually disengaged from the roller and the pacer bar moved back to the starting or any other position on the page. The apparatus includes setting means for the friction wheel and a graduated scale for registering the speed of reading. A limit switch is included in the motor circuit so that the motor will stop automatically when the pacer bar reaches the bottom in the event a person should leave the apparatus with the motor running.

Accordingly the invention is embodied in a reading pacer apparatus constructed and designed as hereinafter described and as illustrated in the accompanying drawings in which Fig. 1 is a plan view of the apparatus with parts broken away and details omitted.

Fig. 2 is a view of the calibrated speed indicator.

Fig. 3 is a side view looking in the direction of arrow 3 in Fig. 1 with parts broken away.

Fig. 4 is a similar view looking in the direction of arrow 4 in Fig. 1.

Fig. 5 is a bottom edge view.

Fig. 6 is a plan view of the mechanism setting and operating the pacer bar with parts broken away and parts removed and looking in the direction of the arrow 6 in Fig. 7.

Fig. 7 is a side view of Fig. 6 looking in the direction of arrow 7 towards the top of the table.

Fig. 8 is a view in the direction of arrow 8 in Fig. 6 with parts in section and parts broken away.

The apparatus comprises a table 10 for the support of the reading matter which is placed upon the table from the right hand side against a strip or curb 11 and resting against a bottom rest 12. The table has two inclined legs 13, 13 so that when the apparatus is placed upon a table or desk, the apparatus is in an inclined position and rests upon the legs 13 and rubber buttons 14. The surface of such table or desk is indicated by the lines 15 in Figs. 3 and 4.

The pacer bar may be in the form of a thin stiff wire 16 and extends across the table 10 at right angles to the curb 11. The bar is carried by a swingable arm 17 pivoted on a fixed shaft 18. The arm may be moved toward and away from the surface of the table 10 to suit the thickness of the reading matter, which, for example, is indicated by dotted lines in Fig. 7 as being a book. The arm 17 is secured to the shaft 18 by a thumb screw 19 so as to be adjusted and the bar 16 is adjustably and detachably secured in the arm by another screw 20.

A base plate 22 is secured to the table 10 by screws 23 (Fig. 1) and carries upper and lower bearings 24, 24 which support two fixed rods 25, 25 which slidably support a bracket 26. The latter is a general supporting member for the friction wheel mechanism and associated parts. As shown in Fig. 6 the shaft 18 is fixed in the bracket 26 as at 28.

The bracket 26 carries a wheel shaft 30 which extends to both sides of the bracket. On the wheel side the shaft carries a wheel fork 31 which supports a freely rotatable friction wheel 32. A spring 33 between the fork and the bracket keeps the wheel in driving engagement with a driven friction roller 35. On the operating side of the bracket 26 the shaft 30 has pinned thereto at 34 a forked crank 36. The bracket also supports a stirrup 38 which in turn carries an adjusting screw 39 in threaded engagement with a sleeve 40 which has a pin 41 engaging the threads of the screw as shown. The bottom of the sleeve 40 is formed as a flat tongue 47 which lies within the forked crank 36 and is slidably pinned thereto by a pin 42. The stirrup 38 carries the graduated indicator plate 43 and the screw 39 is rotated by a hand knob 44 which has a pointer 45 which registers with the scale 46 on the plate 43.

When the knob 44 is rotated, the sleeve 40 is raised or lowered via the screw thread and the pin 41. Thereby the crank 36 is moved to rotate the wheel shaft 30 whereby the wheel is adjusted angularly with respect to the roller 35. The extent of the angular adjustment of the wheel is registered upon the scale 46 as the knob 44 is turned. The wheel shaft 30 carries a pulling knob 50.

As shown in Figs. 6–8, the pacer bar, its setting means and the entire friction wheel mechanism are carried by the bracket 26 which slides upon the rods 25. So long as the wheel engages the roller and the latter is rotated, the wheel moves along the roller and carries with it the bracket 26 and the parts, including the pacer bar, supported thereupon. When the wheel arrives at the bottom of the page or any other selected stopping point, the wheel may be disengaged from the roller by taking hold of the pulling knob 50 to pull the wheel away from the roller against the force of the spring 33. Then by keeping hold on the knob 50, the bracket 26 with all the parts supported thereon may be moved back to the starting or any other upper position on the page, the bracket sliding upon the rods 25. The wheel may be disengaged from the roller at any point between top and bottom and moved to any other position. When the user lets go of the knob 50 the wheel is automatically moved into engagement with the roller by the spring 33.

The extent of rotation of the vertical screw 39 determines the extent of axial movement of the screw sleeve 40 which in turn moves the crank 36 to rotate the wheel shaft 30 angularly in direct response to the setting of the screw 39 as it is moved by the hand knob 44. When the shaft 30 is pulled axially to disengage the wheel, the crank 36 with the pin 42 slides sideways with respect to the flat tongue 47 of the sleeve 40, there being sufficient space on both sides of the tongue 47 to permit such movement.

The friction roller is driven by an electric motor 60 having the usual plug in cable 61 and a circuit controlling switch 62. The circuit includes in known manner a limit switch 63 with a projecting actuating member 64. When the pacer bar arrives at the bottom of the page of reading matter, the stirrup 38 or some other part of the pacer bar unit hits the member 64 to break the circuit and the motor stops. When the pacer bar unit is moved manually away from the motor the circuit is again closed and the motor starts. The electrical details are not shown. The motor is mounted upon the plate 22.

In operating the reading pacer apparatus the user places the reading matter on the table 10 and sets the adjusting screws 19 and 20 so that the bar is in position to move close to the page and operates freely. The pacer bar and wheel mechanism will be at the top of the table. Then by turning the knob 44 the wheel 32 will be set at the correct angle with relation to the roller 35 and as the motor is started the pacer bar will move over the page at the desired speed overlying only one line at a time. The position of the pointer 45 on the scale shows how many inches per minute are read. As the user's reading speed increases, the knob 44 will be moved further along the scale and the user can thus check his progress in reading speed. A stop screw 70 may be placed on the scale member to prevent overturning of the knob 44. The wheel mechanism and associated parts may be enclosed within a housing 72 as shown in Figs. 3 and 4 so that only the operating knobs project therefrom.

The invention is not limited to the exact disclosure and I claim all such changes and modifications as come within the principle of the invention and the scope of the appended claims.

I claim:

1. A reading pacer apparatus of the character described comprising a table for supporting reading matter, a reading pacer bar extending across the table above the reading matter thereon, a mechanism for moving said pacer bar over the reading matter in a plane parallel thereto from any one position thereon to any other position thereon in the same or opposite directions comprising a friction roller, a friction wheel normally engaging said roller to be driven thereby, means for varying the angular position of said wheel with respect to the roller to cause the wheel to move along the roller at a predetermined speed, means connecting said friction wheel with the said pacer bar to move the latter at said predetermined speed, manual means for disengaging said wheel from the said roller and manually move the pacer bar as aforesaid, an electric motor for rotating said roller and a switch controlling the motor circuit.

2. A reading pacer apparatus according to claim 1 including a graduated scale for indicating the speed of movement of the said friction wheel along the said friction roller, a cooperating index member positionable on said scale and means connecting said index member with the said means for varying the position of the said wheel.

3. A reading pacer apparatus according to claim 1 including means for adjusting said pacer bar a distance above said table corresponding to the thickness of the reading matter upon the table.

4. A reading pacer apparatus of the character described comprising a table, a reading pacer bar extending across the table, a mechanism for moving said pacer bar in a plane parallel to the surface of the table in one direction at varying predetermined speeds comprising a friction roller, a friction wheel engaging said roller to be driven thereby, manual means for adjusting the angular position of said wheel with respect to the said roller, means maintaining driving contact between said roller and wheel after the latter has been adjusted as aforesaid, means connecting said pacer bar with said wheel to move synchronously therewith, a motor for rotating the said friction roller, and manual means for disengaging said wheel from the said roller whereby to move the said pacer bar in a direction opposite to the named direction.

5. A reading pacer apparatus of the character described comprising a table for supporting reading matter, a reading pacer bar extending across the table, power means for moving said pacer bar from the top to the bottom of the table comprising a friction roller, a friction wheel engaging the roller, a bracket, means supporting said friction wheel and the said pacer bar on said bracket, means on the bracket for varying the angular position of said wheel with respect to said friction roller to vary the speed of said wheel along the said roller, an electric motor for rotating said friction roller, a limit switch in the motor circuit operable by contact with said bracket to open the motor circuit when said pacer bar reaches the bottom of said table, manual means in said bracket for disengaging said wheel from said roller at any point of the travel of said pacer bar and move the latter to any other point and guiding rods on said table slidably supporting the said bracket.

6. A reading pacer bar apparatus of the character described comprising a friction roller, a friction wheel engaging said roller and capable of variable angular inclination with respect to the axis of the roller to cause said wheel to move along said roller at varying speeds, a supporting bracket, an axially movable and rotatable shaft in said bracket supporting said friction wheel thereon, a spring normally maintaining said wheel in driving contact with the said roller, manual means for axially moving said shaft to disengage said wheel from the said roller, other manual means to vary the angular inclination of the wheel with respect to the roller, a reading pacer bar supported on said bracket and extending across said table, means adjusting the position of said bar with respect to the surface and width of the table, guiding means on the table slidably engaging said bracket to compel the same to move parallel to the sides of the table and a motor for rotating said friction roller.

HENRY S. ALEXANDER.

REFERENCES CITED

The following references are of record in the file of this patent:

UNITED STATES PATENTS

| Number | Name | Date |
| --- | --- | --- |
| 1,587,886 | Whitmore | June 8, 1926 |
| 1,920,024 | Stehli | July 25, 1933 |
| 1,963,880 | Barthelemy | June 19, 1934 |
| 2,061,532 | Zenner et al. | Nov. 17, 1936 |
| 2,078,834 | Brennan | Apr. 27, 1937 |
| 2,098,020 | Wheeler | Nov. 2, 1937 |
| 2,265,924 | Oerter et al. | Dec. 9, 1941 |